No. 784,742.  
PATENTED MAR. 14, 1905.  
G. S. HASTINGS.  
SEAMLESS COMBINATION FERRULE AND BOLSTER FOR KNIVES.  
APPLICATION FILED JULY 1, 1904.
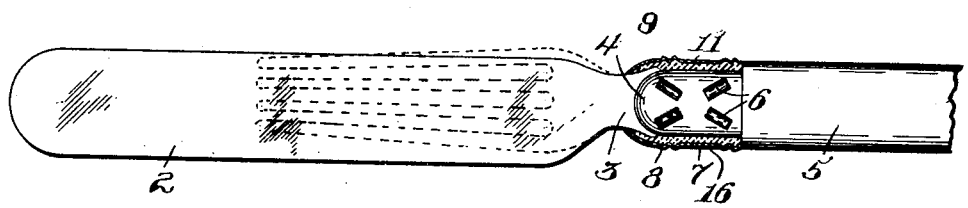
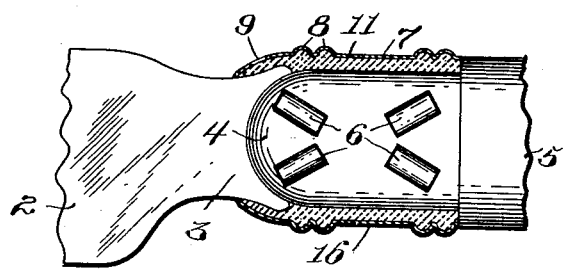
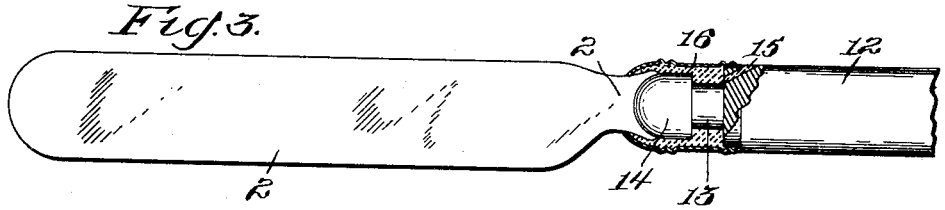
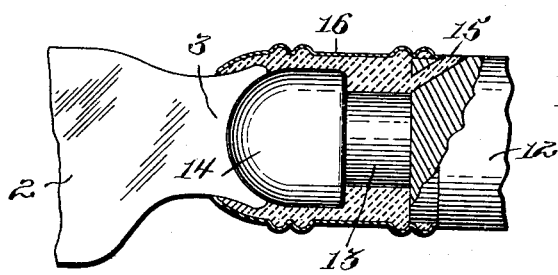
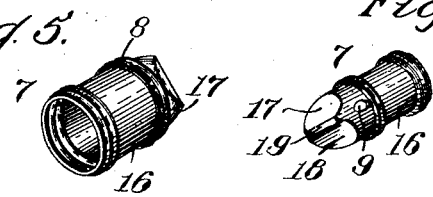
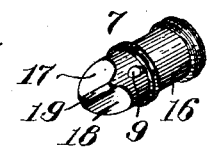
Witnesses:  
G. G. Fuss.  
F. E. Maynard.
Inventor:  
George S. Hastings,  
By his attorney,  
F. H. Richards.

No. 784,742. Patented March 14, 1905.

UNITED STATES PATENT OFFICE.

GLOVER S. HASTINGS, OF PLAINVILLE, CONNECTICUT.

SEAMLESS COMBINATION FERRULE AND BOLSTER FOR KNIVES.

SPECIFICATION forming part of Letters Patent No. 784,742, dated March 14, 1905.

Application filed July 1, 1904. Serial No. 214,856.

*To all whom it may concern:*

Be it known that I, GLOVER S. HASTINGS, a citizen of the United States, residing at Plainville, in the county of Hartford and State of Connecticut, have invented certain new and useful Improvements in Seamless Combination Ferrules and Bolsters for Knives, of which the following is a specification.

This invention has reference to knives, forks, and similar devices and also to the manufacture thereof, an object being to simplify the method of assembling the blade or tang to the handle and also to produce a combination ferrule and bolster suitably adapted for such purpose.

In the manufacture of knives, forks, or the like it is desirable that the blade or tang shall be joined to the handle with a suitable cementitious material—such, for instance, as solder—and this material usually occupies a space between the handle, blade, and a suitably-disposed bolster. Heretofore this solder or other suitable material has been injected into the space between the bolster and the handle in various inconvenient and cumbersome manners, and where a ferrule has been provided with a solder seam it has been found that pouring hot solder against the ferrule causes the soldered seam to separate. In order to obviate such a contingency, I comprehend that it is desirable to build up by stamping, drawing, or otherwise a seamless combination ferrule and bolster, so that when the hot solder is poured into place no ill effects can come to such ferrule and bolster.

I have provided at least two methods of introducing the solder into the space formed by the handle and the ferrule, one being to provide a ferrule and bolster with an opening suitably located in the bolster end in which to inject the solder or other suitable material in cases where the handle will be either of glass or iron, and in case a wooden handle is used I provide such handle with an opening preferably located at the rear of the ferrule and whose mouth is directed into the space formed by the handle and the ferrule instead of having such opening in said bolster.

An embodiment of the present invention is detailed in the accompanying sheet of drawings, whereon—

Figure 1 illustrates in elevation a knife or similar device, a handle, and a bolster made in accordance with this invention. Fig. 2 is a fragmentary view of the same on an enlarged scale. Fig. 3 is a view similar to Fig. 1, showing a wooden handle with an opening therein provided for the introduction of fluent solder. Fig. 4 is an enlarged detail of the same. Fig. 5 illustrates perspectively a ferrule and bolster made in accordance with my invention, and Fig. 6 is a similar perspective view showing the opening in said bolster through which to pour the solder.

Similar characters of reference indicate corresponding parts throughout the figures.

A blade 2, having a shank 3, may in the present instance be butted against an extremity 4 of a handle 5, which in Figs. 1 and 2, respectively, is represented as made of rubber, celluloid, or other suitable material, and such handle in the present instance may be provided with retainers 6, which project outwardly at that end of the handle 5 upon which the ferrule is placed.

For the purpose of uniting the blade and handle, respectively, there is provided a bolster 7, which in the present instance may be provided with ribs 8, which extend out beyond the line of the bolster and the handle, so that if the knives or forks are dropped onto a hard surface such ribs may intervene to prevent violent contact of the handle with the surface, whereby the integrity of the handle may be maintained. This combination ferrule and bolster in the present instance may be provided at any suitable point, but preferably at the bolster end thereof, with an opening 9, (clearly shown in Fig. 6,) through which to inject a mass of cementitious material or solder, which is intended to occupy a space 11, formed by the handle and the bolster, respectively, and which in the present instance will flow about the various retainers 6, formed on the handle, so as to more securely maintain the assembled elements intact.

In Figs. 3 and 4, respectively, the blade 2 is provided with a handle 12, preferably made from wood, bone, ivory, or the like, and one end of such handle is provided with a neck 13 and a head 14, as clearly shown in said Figs. 3 and 4. This handle is also provided with a channel or conduit 15, running from the outside of the handle, preferably diagonally, toward the neck portion 13 and also from behind the bolster, so that molten solder may be injected from the rear of the bolster into the space formed by the handle and bolster.

Inasmuch as the solder is injected into either of the openings aforementioned in a highly fluent and heated state, it is necessary the bolster shall be so formed as to prevent it from being affected by the heated metal, and therefore I have provided a combination ferrule and bolster struck up or formed in one piece and which constitutes in the present instance a body 16, having reduced portions 17 and 18, respectively, leading to an opening 19, through which a shank 3 of the blade 2 is adapted to pass. As hereinbefore mentioned, this bolster may be provided with suitable projections or protuberances 8, preferably of a flexible nature, for the purposes hereinafter mentioned, and which also assist in more permanently interlocking the various parts, as is obvious.

It will now be observed that I provide efficient and simple means for uniting the blades of knives to the handles by introducing the solder either through a port in the uniting-bolster or in the handle back of the ferrule, and, further, that I provide a specially-devised and appropriate combination ferrule and bolster for this purpose, one which can withstand the heat of the molten metal used in uniting such elements, which can duly expand and contract under varying conditions without affecting the same. It will also be remembered that within the purview of this invention I may resort to various modifications of structure without departing from the spirit thereof.

Having thus described my invention, I claim—

1. The combination with a handle, a blade having a short tang resting against one end of said handle, and a combined ferrule and bolster, the forward end of which overhangs and engages with the tang, and which is provided with an opening leading to a space between the handle and bolster through which to inject molten metal.

2. The combination with a handle, a blade having a short tang resting against the handle end, and a combined ferrule and bolster being struck up in one piece and provided with protuberances and having an opening at its fore part through which to inject metal adapted to flow around and confine said tang to the handle, and retainers on said handle adapted to be embedded in said metal.

GLOVER S. HASTINGS.

Witnesses:
M. J. ABBOTT,
HENRY A. HURLIN,